United States Patent
Weber

(10) Patent No.: US 8,985,626 B2
(45) Date of Patent: Mar. 24, 2015

(54) FIXING ELEMENT FOR LOCKING A HINGED HAND CRANK ON THE INPUT SHAFT OF A SUPPORT WINCH FOR A SEMI-TRAILER

(75) Inventor: Elmar Weber, Dülmen (DE)

(73) Assignee: SAF-Holland GmbH, Bessenbach (DE)

( * ) Notice: Subject to any disclaimer, the term of this patent is extended or adjusted under 35 U.S.C. 154(b) by 0 days.

(21) Appl. No.: 13/991,778

(22) PCT Filed: Oct. 14, 2011

(86) PCT No.: PCT/EP2011/067980
§ 371 (c)(1),
(2), (4) Date: Jun. 5, 2013

(87) PCT Pub. No.: WO2012/076221
PCT Pub. Date: Jun. 14, 2012

(65) Prior Publication Data
US 2013/0247710 A1 Sep. 26, 2013

(30) Foreign Application Priority Data
Dec. 7, 2010 (DE) .......................... 10 2010 062489

(51) Int. Cl.
*B60S 9/02* (2006.01)
*G05G 1/12* (2006.01)
*B60S 9/08* (2006.01)
(Continued)

(52) U.S. Cl.
CPC ... *G05G 1/12* (2013.01); *B60S 9/08* (2013.01); *F16D 1/108* (2013.01); *F16D 2001/102* (2013.01)
USPC .......................... 280/766.1; 254/419; 254/420

(58) Field of Classification Search
USPC ....................................................... 280/766.1
See application file for complete search history.

(56) References Cited

U.S. PATENT DOCUMENTS 7,303,210 B2 * 12/2007 Baxter et al. ............... 280/766.1
2006/0202460 A1   9/2006 Baxter et al.
(Continued)

FOREIGN PATENT DOCUMENTS

EP   1670667   6/2006
JP   55140370   10/1980
(Continued)

OTHER PUBLICATIONS

SAF-Holland Group, "Operating and Maintenance Manual," http://literature1.safholland.com/quicklit/SAF_Landing_Gear_Owners_Manual_en-DE.pdf, Jun. 23, 2010, pp. 12-16.

*Primary Examiner* — J. Allen Shriver, II
*Assistant Examiner* — Hilary L Johns
(74) *Attorney, Agent, or Firm* — Price Heneveld LLP

(57) ABSTRACT

The invention relates to a fixing element for locking a hinged hand crank on the input shaft of a support winch for semi-trailers, wherein the hand crank is fastened to the input shaft in an articulated manner and can pivot between at least one folded-in rest position and at least one folded-out usage position. According to the invention, said fixing element has a fastening section for fastening to the hand crank and a spring bar connected to the fastening section on which at least one locking section is formed, wherein the locking section reaches over the end face of the input shaft in a form-fitting manner in a folded-out usage position of the hand crank and is simultaneously pulled against said end face of the input shaft.

11 Claims, 4 Drawing Sheets

(51) Int. Cl.
*F16D 1/108* (2006.01)
*F16D 1/10* (2006.01)

(56) References Cited

U.S. PATENT DOCUMENTS

2007/0152437 A1 7/2007 Baxter et al.
2007/0235981 A1 10/2007 Bohnett
2007/0257243 A1* 11/2007 Cofer .......................... 254/419
2008/0164683 A1 7/2008 VanDenberg

FOREIGN PATENT DOCUMENTS

RU 2175947 11/2001
WO 2004098965 11/2004
WO 2010100017 9/2010

* cited by examiner

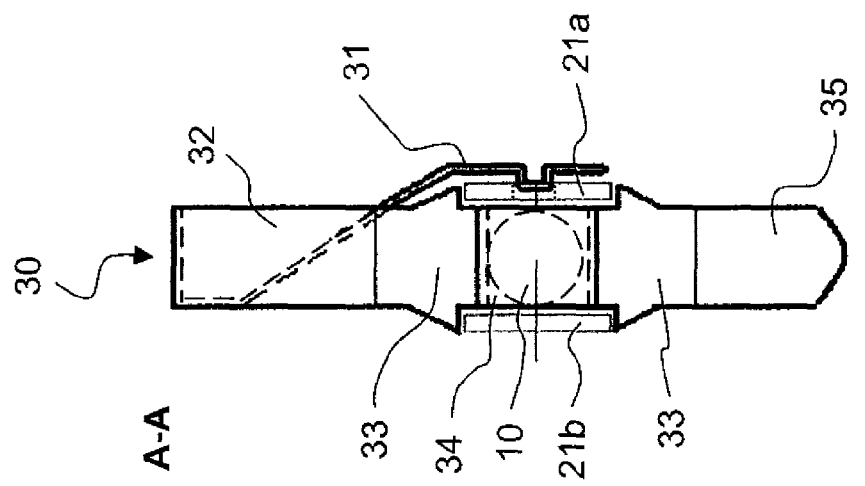
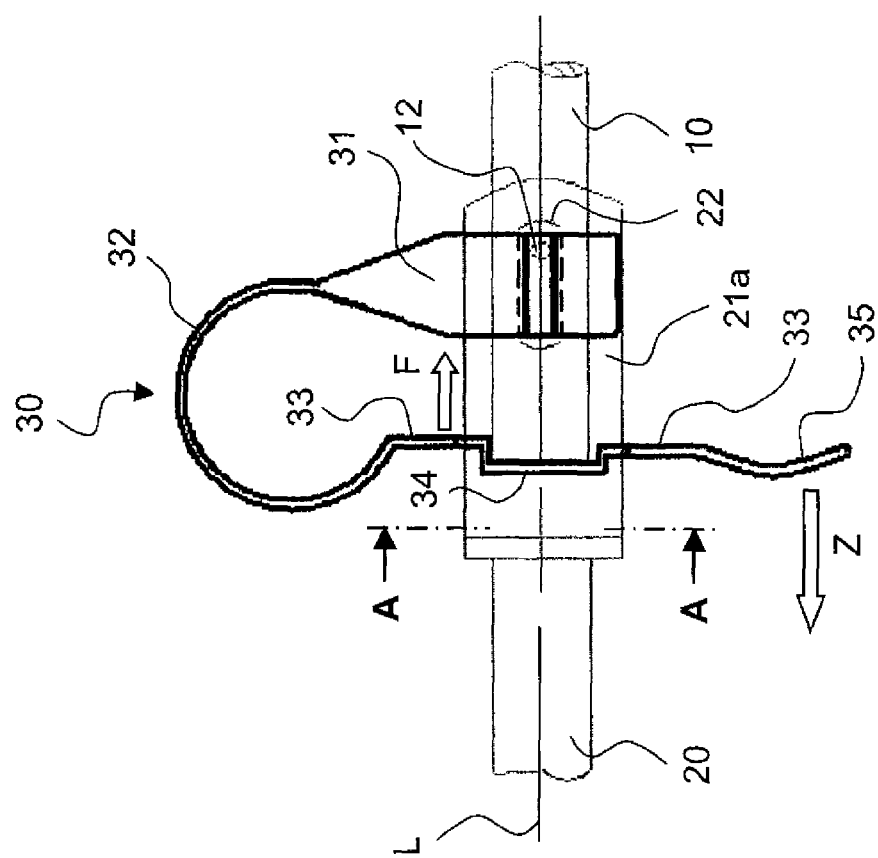
Fig. 1b
Fig. 1a

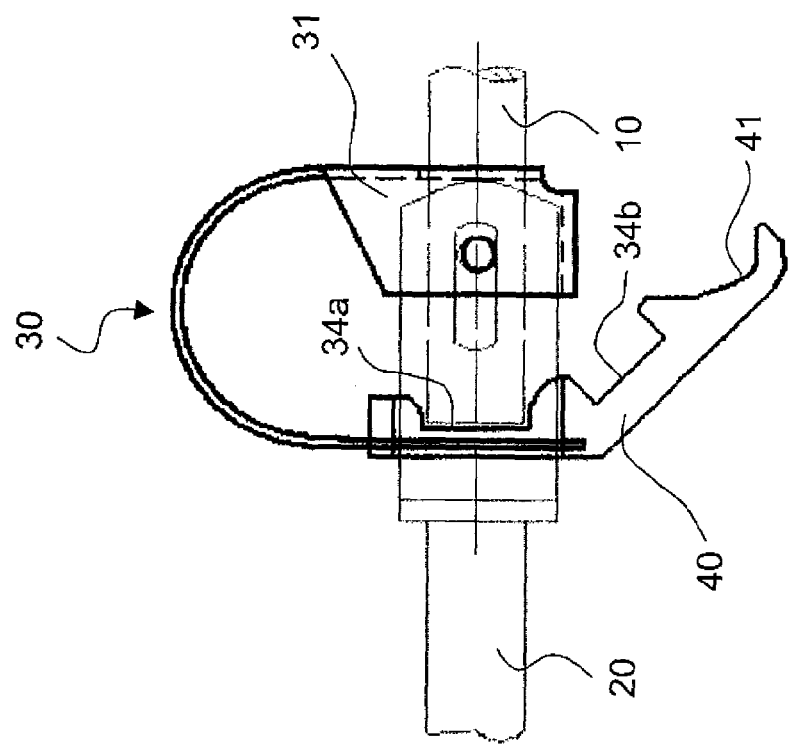
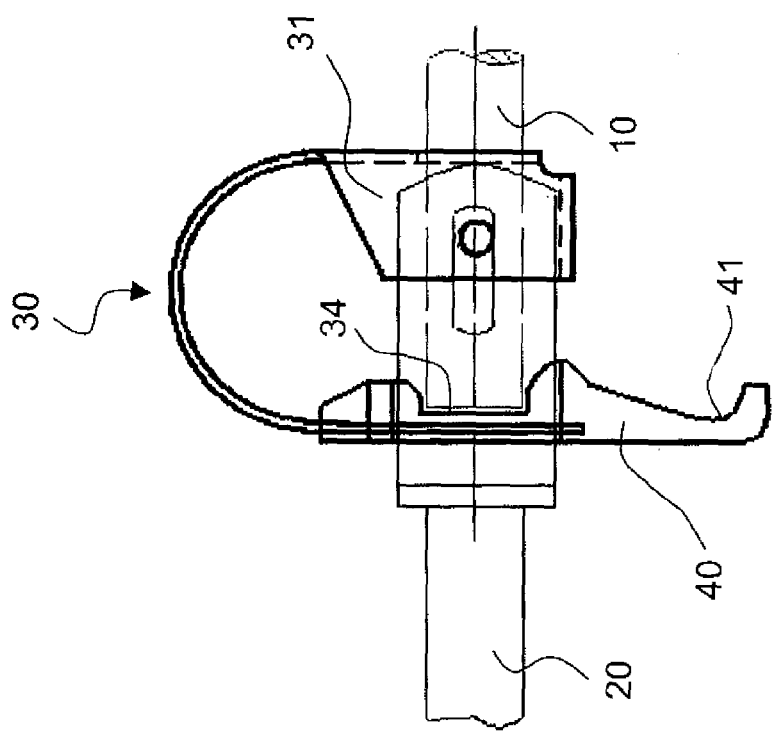
Fig. 4
Fig. 5

FIXING ELEMENT FOR LOCKING A HINGED HAND CRANK ON THE INPUT SHAFT OF A SUPPORT WINCH FOR A SEMI-TRAILER

FIELD OF THE INVENTION

The invention relates to a fixing element for locking a hinged hand crank on the input shaft of a support winch or landing gear for semi-trailers or the like, wherein the hand crank is fastened to the input shaft in an articulated manner and can be pivoted between at least one folded-in rest position and at least one folded-out usage position.

BACKGROUND OF THE INVENTION

Support winches or height-adjustable supports for semi-trailers or the like are known from the state of the art. In most cases, the height adjustment of said support winches is done by means of a hand-driven mechanism, to which end there is provided a hand crank, which, when required, is connected to a respective actuator. Furthermore, there are known hinged hand cranks which are connected to an input shaft of the actuator in an articulated manner and which may be pivoted between at least one folded-in rest position and at least one folded-out usage position.

SUMMARY OF THE INVENTION

The fixing element according to the invention serves for locking a hinged hand crank on the input shaft of a support winch for semi-trailers or the like, wherein the hand crank is fastened to the input shaft in an articulated manner and can pivot between at least one folded-in rest position and at least one folded-out usage position. It is provided that said fixing element has a fastening section for fastening to the hand crank, as well as a spring bar connected to the fastening section. The spring bar includes at least one locking section, wherein the locking section reaches over the end face of the input shaft in an at least partially form-fitting manner in a folded-out usage position of the hand crank and is simultaneously pre-tensioned or pulled against said end face of the input shaft by means of a spring force, whereby the hand crank is releasably locked. The fixing element according to the invention makes it easily possible to lock the hand crank in a usage position. Furthermore, locking by means of the fixing element according to the invention makes it possible to achieve an optimal lever position of the hand crank relative to the input shaft of the support winch, which facilitates rotation. In the case of removable hand cranks the fixing element according to the invention may also reliably prevent that the hand crank detaches from the input shaft. On the whole, the danger of injuries to the face, knee(s) and/or back is reduced so that the fixing element according to the invention also serves the purposes of safety at work.

Preferably, there is provided that the fixing element is self-locking. This is done in that, when the hand crank is pivoted from its rest position, the spring bar is moved or deflected in a resetting or spring resilient manner and the locking section on the spring bar by spring-back or reset automatically reaches over the end face of the input shaft in an at least partially form-fitting manner when the hand crank assumes a usage position. Unlocking may be done by manually retracting or pulling back the spring bar on the fixing element so that there is no longer a form-fit or positive locking between the locking section on the spring bar and the end face of the input shaft.

There may be formed several locking sections and in particular two locking sections on the spring bar so that several different usage positions for the hand crank become possible. Preferably, the spring bar is connected to the fastening section by means of an arched section, wherein said arched section at least promotes the spring-resilient properties of the spring bar.

An articulated connection between a hand crank and the input shaft of a support winch is often realized as a slotted guide mechanism, wherein in the connection area on the hand crank there are formed two elongated slots which are arranged opposite each other, in each of which there is accommodated an arbor or pin which is connected to the input shaft and by means of which there is provided the torque proof connection to the input shaft. Preferably, the fastening section is formed on the fixing element according to the invention such that it may engage the elongated slots from the outside on both sides or that it may engage only one elongated slot on one side on the hand crank. As a result, the fixing element is fastened to the hand crank. Furthermore, the locking forces and torques which have to be applied on the spring bar are supported on the hand crank. In addition, it is also possible to disable the arbors by blocking the elongated slots so that it is no longer possible to move the hand crank in the axial direction relative to the input shaft.

Alternatively, there may be provided that the fastening section on the fixing element according to the invention is designed such that in the connection area it may at least partially reach over the axial end of the hand crank. It is also possible to combine both fastening concepts.

Preferably, there is provided that the fixing element according to the invention essentially is made from or consists of a high quality steel material or a stainless spring steel material and is made in particular by forming or working a sheet material. The fixing element according to the invention may be designed as a single-piece. Irrespective of this, the locking section may be formed on a separate plastic part which is fastened to the spring bar as an end piece. As a result it is possible to prevent a metallic scratching of the spring bar on the input shaft, for example. Preferably, at least the end section of the spring bar or the plastic part fastened on the spring bar has a signal color or warning color. Such signal color may be single-colored (e.g. neon colors or other signal colors) or multi-colored.

Further features and advantages of the invention result from the following description of preferred embodiments of the invention with reference to the appended Figures, wherein individual features of different embodiments may be combined to form new embodiments.

FIG. 1a shows a side view of a first embodiment of a fixing element according to the invention.

FIG. 1b shows a front view of the fixing element of FIG. 1a, according to the section indicated in FIG. 1a.

FIG. 4 shows a side view of a third embodiment of a fixing element according to the invention.

FIG. 5 shows a side view of a fourth embodiment of a fixing element according to the invention.

In the following, identical elements and/or elements having the same function are designated by the same reference sign. Different features of distinct embodiments may be combined with each other within the framework of the invention.

Figure 2:
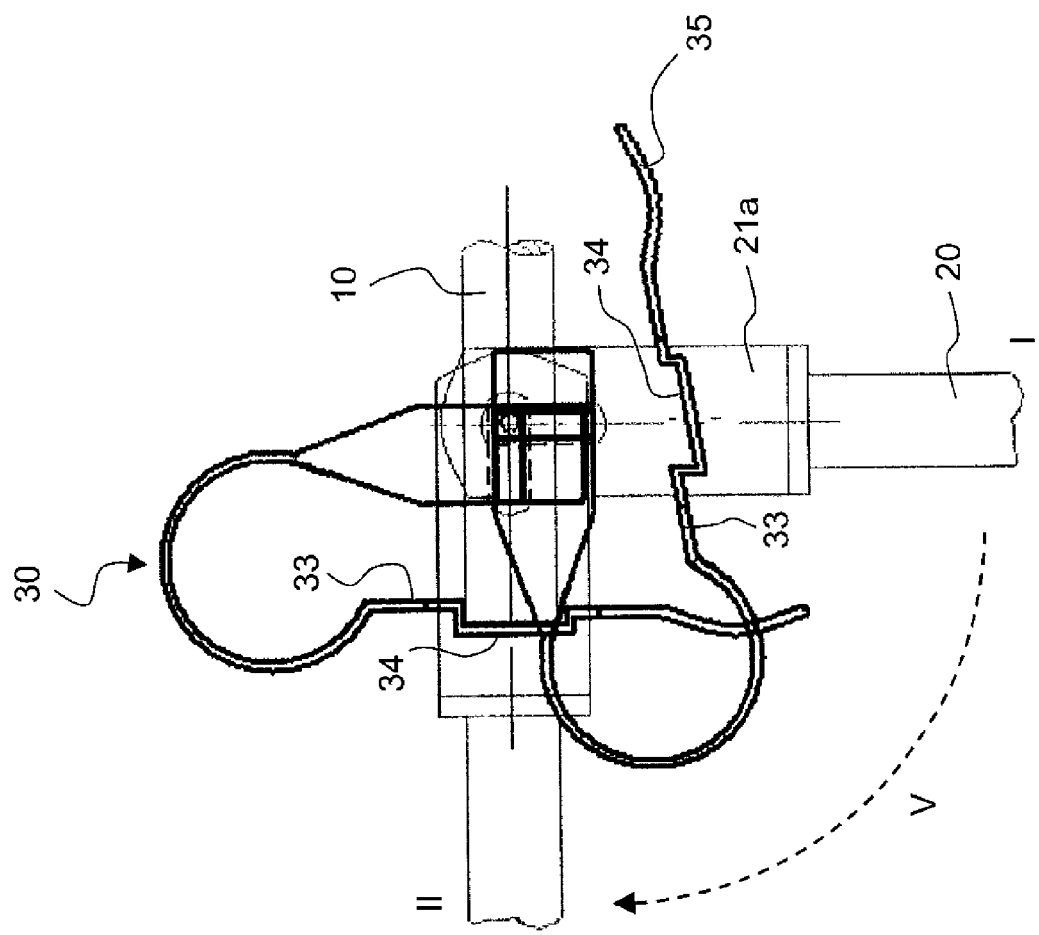
FIG. 2 shows a side view of the self-locking property of the fixing element of FIG. 1a when the hand crank is pivoted.

FIG. 1a shows an input shaft 10 of a support winch for semi-trailers or the like, which input shaft is represented with a section break. On the input shaft 10 there is fastened in an articulated manner a hand crank 20 which is also represented with a section break. The hand crank 20 comprises a fork-shaped end section whose legs 21a and 21b reach over the axial end of the input shaft 10 from both sides (FIG. 1b). The legs 21a and 21b of the fork-shaped end section are each formed with an elongated slot 22. The articulated fastening of the hand crank 20 on the input shaft 10 is done by means of arbors 12, which are formed on the input shaft 10 and which engage the elongated slots 22 so that there is provided a connection similar to a cardan joint or universal joint. Instead of arbors 12 it is also possible to provide a releasable journal which is inserted into a transverse bore or cross hole through the input shaft 10. The articulated fastening of the hand crank 20 on the input shaft 10 may be a releasable joint so that it is possible to remove the hand crank 20.

FIG. 1 shows the hand crank 20 in a usage position, wherein the end section of the hand crank 20 and the end section of the input shaft 10 are arranged relative to each other such that they are axially aligned, which is made clear by the common axis L shown. Such an axially aligned arrangement of the hand crank 20 and the input shaft 10, however, is not mandatory.

In order to lock the hand crank 20 in the usage position shown, there is provided a fixing element 30. The fixing element 30 comprises a fastening section 31 for fastening on the hand crank 20. Furthermore, the fixing element 30 comprises a spring bar 33 which is connected to the fastening section 31 by means of an arched section (resilient bend) 32. On the spring bar 33 there is formed a slot-like locking section 34. In the usage position of the hand crank 20 shown the locking section 34 reaches over the end face of the input shaft 10 in a form-fitting manner and, due to the spring effect or resilience inherent in the spring bar 33, is simultaneously pulled against said end face of the input shaft 10, which is indicated by arrow F. As a result, the hand crank 20 is locked. Furthermore, the weight forces of the hand crank 20 and the effective tilting effects are supported on the input shaft 10. By manually applying a tensile force on the end section 35 of the spring bar 33, which is indicated by arrow Z, it is possible to move back the spring bar 33 and to undo the locking.

The fastening section 31 of the fixing element 30 is designed such that it engages the elongated slot 22 on the hand crank 20 in a form-fitting manner (FIG. 1b). As a result, the fixing element 30 is fastened. Furthermore, the locking forces and moments to be applied on the spring bar 33 are supported. Moreover, the elongated slot 22 is blocked so that the hand crank 20 is no longer movable in an axial direction (L) relative to the input shaft 10. Contrary to the embodiment shown in FIGS. 1a and 1b there may be provided a fastening section 31 which engages both elongated slots 22 on the hand crank 20 from both sides.

The fixing element 30 is made single-piece as a sheet forming part from a high quality steel material or a stainless spring steel material. However, it may also be made from any other resilient material. The width of the fixing element 30 essentially does not exceed the width of the fork-shaped section of the hand crank 20, which can be easily seen from FIG. 1b. The spring bar 33 is designed narrower in the area where it is guided through the legs 21a and 21b on the hand crank 20, which is also readily visible from FIG. 1b. Since the spring bar 33 reaches over the legs 21a and 21b outside of said lead-through, the spring bar 33 is supported on the legs 21a and 21b and guided in the axial direction (L).

FIG. 2 shows the pivoting of the hand crank 20 from a folded-in rest position I into the folded-out usage position II according to FIG. 1a, which is indicated by a pivot arrow V.

The fixing element 30 is designed self-locking such that the spring bar 33 is elastically hinged or moved or deflected when the hand crank 20 is pivoted or lifted V, and the locking section 34 on the spring bar 33 automatically reaches over the end face of the input shaft 10 in a form-fitting manner due to a spring back of the spring bar 33 when the hand crank 20 assumes the usage position II shown. The hinging or deflection of the spring bar 33 when the hand crank 20 is pivoted V is done self-explanatorily due to a sliding on the input shaft 10.

Figure 3:
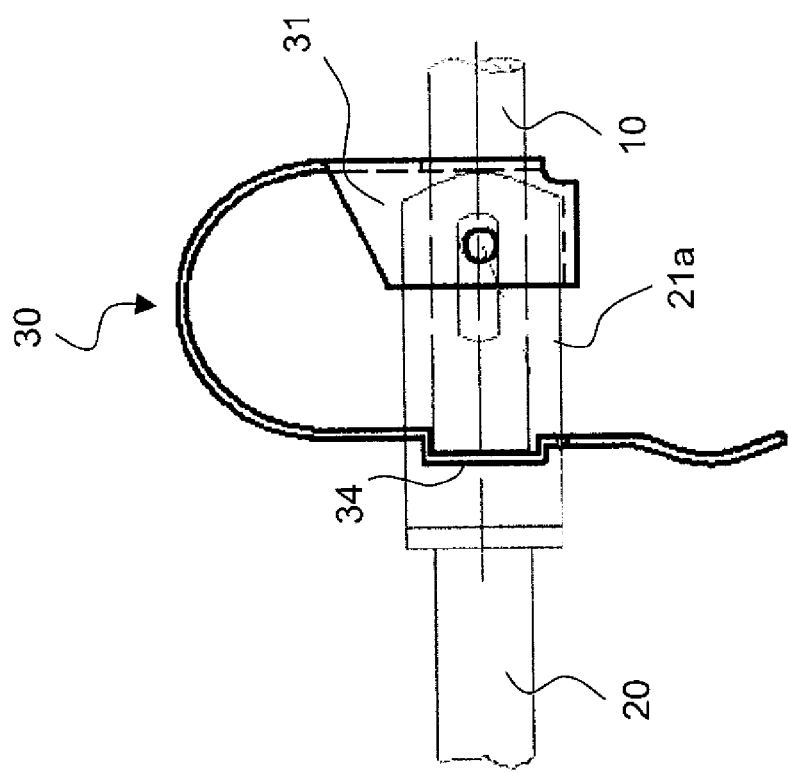
FIG. 3 shows a side view of a second embodiment of a fixing element according to the invention.

FIG. 3 shows a second embodiment of a fixing element 30, whose fastening section 31 is designed such that it reaches over the axial end of the hand crank 20 in a form-fitting manner, wherein at least one of the two legs 21a and 21b is reached over.

FIG. 4 shows a third embodiment of a fixing element 30 which comprises a plastic part 40 which is fastened as an end piece on the spring bar 33. The fastening may be done by means of screwing/bolting, riveting or gluing to the spring bar 33 or by coating the spring bar 33 with a plastic material. On the plastic part 40 there is formed the locking section 34. Such a plastic part 40 may be manufactured in a relatively cost-efficient manner and with a high degree of design liberty. Furthermore, there is the possibility of providing the plastic part 40 with a signal color, wherein also the spring bar 33 and in particular the end section 35 of the spring bar may be provided with such a signal color. 41 designates a handle piece on the plastic part 40 which provides a protection against injury and a pleasant haptic perception when the spring bar 33 is pulled back.

FIG. 5 shows a fourth embodiment of a fixing element 30 where, contrary to the third embodiment of FIG. 4, there are formed two locking sections 34a and 34b on the plastic part 40 so that two different locking positions are made possible for a hand crank 20. Thus, it is also possible to lock S-shaped hand cranks, for example, using the same fixing element 30 (in the second locking section 34b). In order to form several locking sections, the use of a plastic part 40 is particularly suitable, wherein they might also be formed directly on the spring bar 33.

The above-explained distinct embodiments of a fixing element 30 according to the invention can be releasably fastened on common hand cranks 20 and, thus, may be exchanged in the case of damage or wear. The function of the hand crank 20 is not impaired hereby and is maintained even if the fixing element 30 fails or is omitted. Furthermore, it is possible to fasten the fixing element 30 to the hand crank 20 in a non-releasable manner.

The invention claimed is:

1. An actuating system for a support winch on a semi-trailer, comprising:
 a hand crank and a fixing element for locking the hand crank on an input shaft of the support winch;
 wherein the hand crank is fastened to the input shaft in an articulated manner and can pivot between at least one folded-in rest position and at least one folded-out usage position;
 wherein the fixing element comprises a fastening section for fastening to the hand crank, and a spring bar connected to the fastening section, wherein the spring bar includes at least one locking section; and
 wherein the at least one locking section reaches over an end face of the input shaft in an at least partially form-fitting manner in a folded-out usage position of the hand crank and is simultaneously pulled against the end face of the input shaft, whereby the hand crank is releasably locked.

2. The actuating system of claim 1, wherein the fixing element includes a self-locking mechanism, wherein when the hand crank is pivoted from the folded-in rest position to the folded-out usage position the at least one locking section of the spring bar reaches over the end face of the input shaft in an at least partially form-fitting manner when the hand crank defines the folded out usage position.

3. The actuating system of claim 1, wherein the spring bar includes a plurality of locking sections defining a plurality of usage positions of the hand crank.

4. The actuating system of claim 1, wherein the spring bar includes first and second locking sections defining a plurality of usage positions of the hand crank.

5. The actuating system of claim 1, wherein the spring bar is connected to the fastening section by an arched section.

6. The actuating system of claim 1, wherein the fastening section is configured to engage at least one elongated slot defined by the hand crank.

7. The actuating system of claim 1, wherein the fastening section is configured to at least partially reach over an axial end of the hand crank.

8. The actuating system of claim 1, wherein the fixing element includes at least one of a steel material and a stainless spring steel.

9. The actuating system of claim 1, wherein the at least one locking section is coupled with an end piece of the spring bar.

10. The actuating system of claim 9, wherein the at least one locking section coupled with the spring bar includes at least one of a signal indicia and a warning indicia.

11. The actuating system of claim 1, wherein at least the end section of the spring bar includes at least one of a signal indicia and a warning indicia.

* * * * *